(12) United States Patent
Ostromek et al.

(10) Patent No.: US 6,970,190 B2
(45) Date of Patent: Nov. 29, 2005

(54) EVENT SYNCHRONIZATION FOR DETECTOR SYSTEMS

(75) Inventors: Timothy E. Ostromek, Richardson, TX (US); Timothy B. Hogan, Irving, TX (US); Antonio V. Bacarella, Dallas, TX (US); Jeffrey C. Short, Plano, TX (US); Jerry D. Porter, Dallas, TX (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/250,189

(22) Filed: Jun. 11, 2003

(65) Prior Publication Data

US 2003/0234870 A1 Dec. 25, 2003

Related U.S. Application Data

(60) Provisional application No. 60/319,310, filed on Jun. 12, 2002.

(51) Int. Cl.$^7$ ............................................. H04N 5/225
(52) U.S. Cl. ................................................... 348/217.1
(58) Field of Search .......................... 348/217.1, 229.1, 348/364, 216.1, 370, 371, 224.1; 250/208.1

(56) References Cited

U.S. PATENT DOCUMENTS

| | | | | |
|---|---|---|---|---|
| 4,071,752 A | * | 1/1978 | Manning | ............... 250/214 VT |
| 4,463,252 A | | 7/1984 | Brennan et al. | |
| 4,602,861 A | | 7/1986 | Taniguchi et al. | |
| 4,628,352 A | * | 12/1986 | Boue | ........................... 348/61 |
| 4,649,426 A | * | 3/1987 | Bolstad | ........................ 348/90 |
| 4,679,068 A | | 7/1987 | Lillquist et al. | ............... 348/33 |
| 4,751,571 A | | 6/1988 | Lillquist | |
| 4,872,057 A | * | 10/1989 | Woolfolk | ................... 348/217.1 |
| 5,001,552 A | * | 3/1991 | Okino | ...................... 348/224.1 |
| 5,035,472 A | | 7/1991 | Hansen | |
| 5,268,570 A | | 12/1993 | Kim | |
| 5,378,640 A | | 1/1995 | Kim | |
| 5,557,451 A | | 9/1996 | Copenhaver et al. | |
| H1599 H | | 10/1996 | Task et al. | ..................... 348/33 |
| 5,729,010 A | | 3/1998 | Pinkus et al. | |
| 5,729,376 A | | 3/1998 | Hall et al. | |
| 5,756,989 A | * | 5/1998 | Bear et al. | ............. 250/214 VT |
| 5,872,595 A | * | 2/1999 | Monahan | .................. 348/217.1 |
| 5,910,816 A | | 6/1999 | Fontenot et al. | |
| 6,115,449 A | * | 9/2000 | Jang et al. | ..................... 378/41 |
| 6,121,612 A | | 9/2000 | Sinor et al. | |
| 6,381,011 B1 | * | 4/2002 | Nickelsberg et al. | ....... 356/73.1 |
| 6,437,491 B1 | | 8/2002 | Estrera et al. | |
| 6,560,029 B1 | | 5/2003 | Dobbie et al. | .............. 359/630 |

(Continued)

FOREIGN PATENT DOCUMENTS

WO WO 01/72033 A1 9/2001

*Primary Examiner*—Aung Moe
(74) *Attorney, Agent, or Firm*—Marsteller & Associates, P.C.

(57) ABSTRACT

An event synchronizing apparatus E for an image intensification camera system C for gathering image data includes an image intensifier 348 for amplifying received light 312. A relay optic assembly 316 is coupled between the image intensifier 348 and a digital image sensor 350, such as a CMOS or CCD device. Digital logic 352 is used to process or output an image or related data 334. An event detector 340 digitizes an input signal 342 from an illumination source 338 and generates an electrical output synchronization signal 346 in response to the input optical signal 342. The image intensifier camera C derives imaging and control information for the synchronization signal.

7 Claims, 4 Drawing Sheets

U.S. PATENT DOCUMENTS

| | | |
|---|---|---|
| 6,570,147 B2 | 5/2003 | Smith |
| 6,593,561 B2 * | 7/2003 | Bacarella et al. ........ 250/208.1 |
| 2003/0066951 A1 | 4/2003 | Benz et al. |
| 2003/0147002 A1 * | 8/2003 | Ray et al. ................... 348/370 |
| 2003/0230707 A1 * | 12/2003 | Hogan et al. ......... 250/214 VT |
| 2003/0231245 A1 * | 12/2003 | Bacarella et al. ........ 348/217.1 |

* cited by examiner

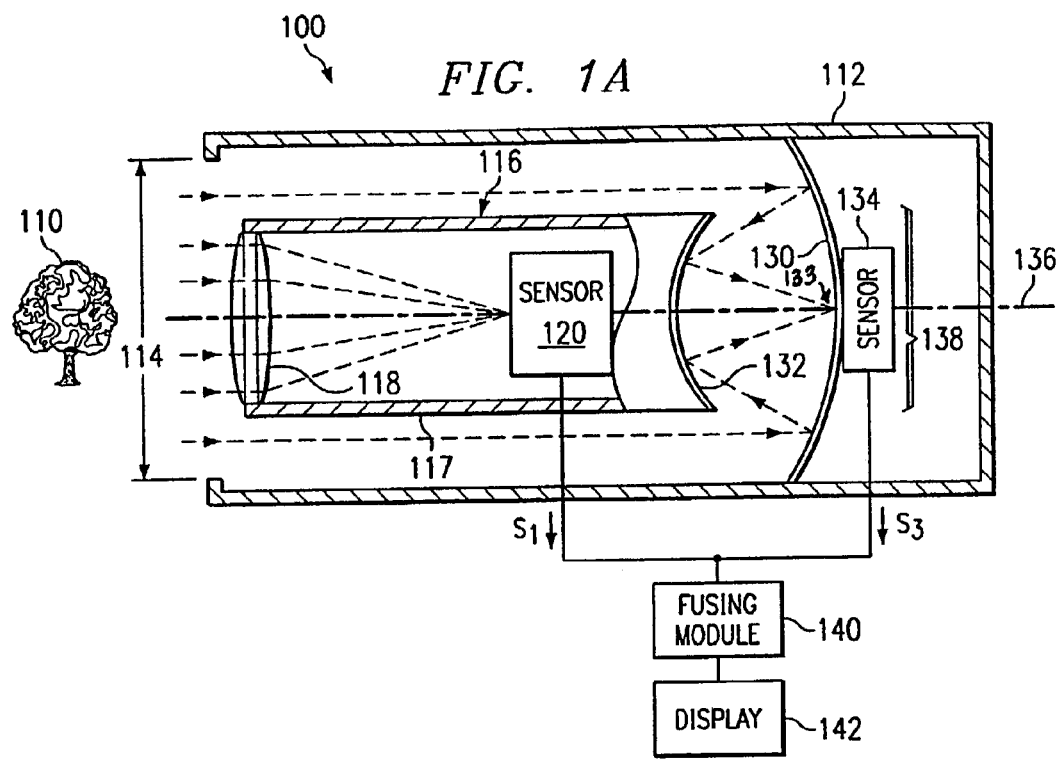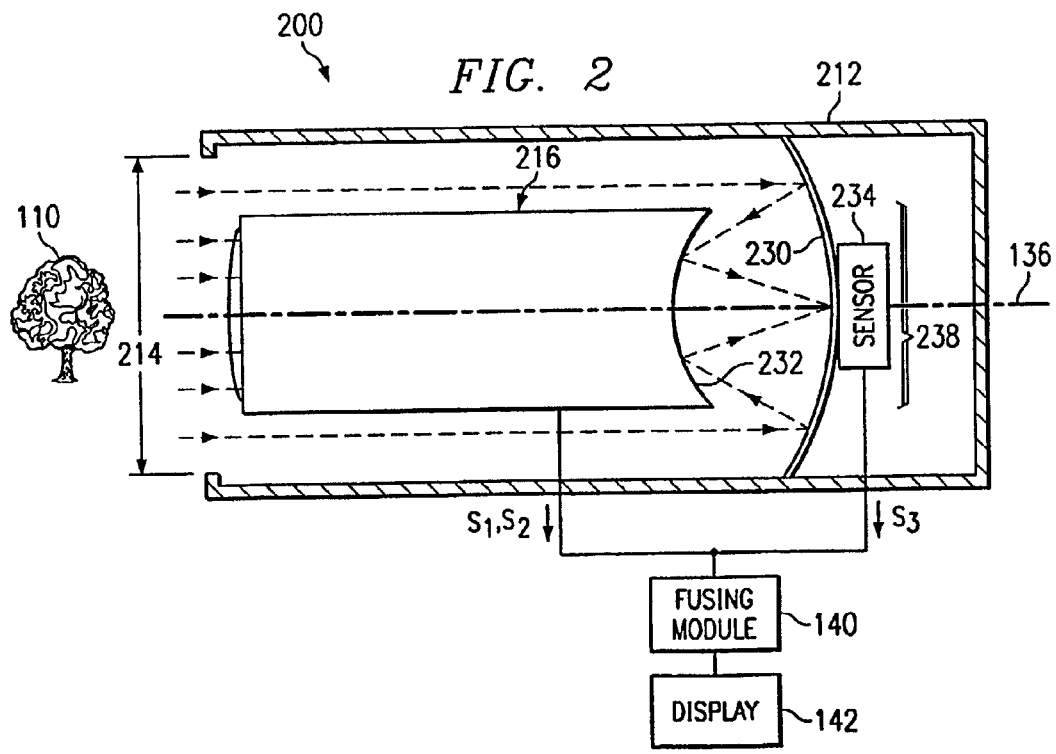

US 6,970,190 B2

EVENT SYNCHRONIZATION FOR DETECTOR SYSTEMS

CROSS REFERENCE TO RELATED APPLICATIONS

This application claims the benefit of U.S. Provisional Application Ser. No. 60/319,310, filed Jun. 12, 2002, entitled EVENT SYNCHRONIZATION FOR DETECTOR SYSTEMS.

BACKGROUND OF INVENTION

1. Technical Field

This invention relates generally to the field of imaging systems and more specifically to a digital image intensifier camera for gathering image data using multiple sensors.

2. Background Art

Multiple sensor imaging systems generate an image of an object by fusing data that is collected using multiple sensors. Gathering image data using multiple sensors, however, has posed challenges. In some systems, the sensors detect light received from separate apertures. Data generated from light from separate apertures, however, describe different points of view of an object that need to be reconciled in order to fuse the data into a single image. Additionally, using separate apertures for different sensors may increase the bulk of an imaging system.

In other systems, light from an aperture is split into components before entering the sensors. Reflective and refractive elements are typically used to direct the light to different sensors. For example, the system described in U.S. Pat. No. 5,729,376 to Hall et al. includes multiple reflective and refractive elements such as a lens that reflects light towards one sensor and refracts light towards another sensor. Each individual sensor, however, detects only a component of light, for example, only specific wavelengths of light, and thus cannot generate image data from the full spectrum. Additionally, multiple reflective and refractive elements may add to the bulk and weight of an imaging system. Consequently, gathering image data from multiple sensors has posed challenges for the design of imaging systems.

While the above cited references introduce and disclose a number of noteworthy advances and technological improvements within the art, none completely fulfills the specific objectives achieved by this invention.

SUMMARY OF INVENTION

While known approaches have provided improvements over prior approaches, the challenges in the field of imaging systems have continued to increase with demands for more and better techniques having greater effectiveness. Therefore, a need has arisen for new methods and systems for gathering image data using multiple sensors.

In accordance with the present invention, an image intensification camera system for gathering image data includes an image intensifier for amplifying received light. A relay optic assembly is coupled between the image intensifier and a digital image sensor, such as a CMOS or CCD device. Digital logic is used to process or output an image or related data.

Embodiments of the present invention provide a system and method for gathering image data from multiple sensors in an effective and compact manner.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIGS. 1A and 1B illustrate one embodiment of a system for gathering image data.

FIG. 2 illustrates one embodiment of a system for gathering image data that includes three or more sensors.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1B:
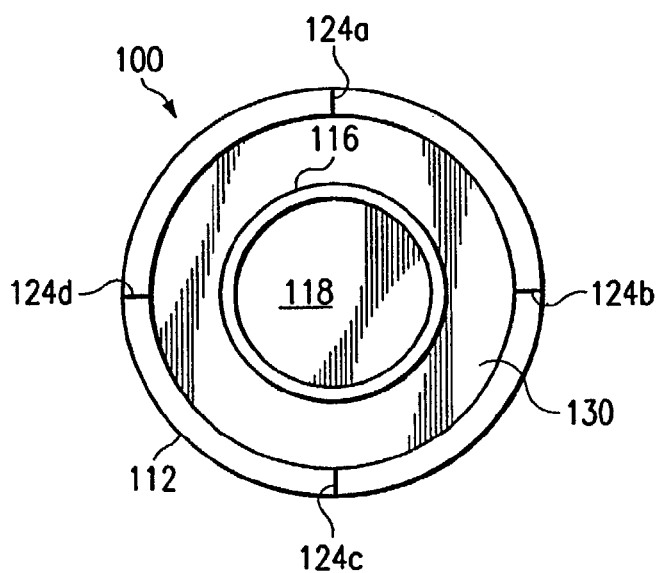

FIG. 1A illustrates a side view of one embodiment of a system 100 for gathering image data. System 100 receives light or an energy signal reflected from an object 110 and gathers information from the light or input signal to generate an image of object 110 on a display 142. System 100 may include an outer casing 112 having an aperture 114 through which light enters. Outer casing 112 may have any suitable shape such as a cylinder having a diameter in the range of 8–12 cm, for example, approximately 10 cm, and a length in the range of 12–15 cm, for example, approximately 14 cm. System 100 may also include an inner assembly 116 coupled to outer casing 112 with braces 124 as illustrated in FIG. 1B. FIG. 1B illustrates a front view of inner assembly 116 coupled to casing 112 with braces 124.

Referring to FIG. 1A, inner assembly 116 may include optics 118 and a sensor 120, each of which may be coupled to an inner casing 117. Inner casing 117 may have any suitable shape such as a cylinder having a diameter in the range of 3 to 6 cm, for example, approximately 4.5 cm, and a length in the range of 7 to 10 cm, for example, approximately 8 cm in length. Optics 118 focuses light reflected from object 110 onto sensor 120. Optics 118 may include, for example, a lens comprising glass or polymer having a radius in the range of 3 to 5 cm, for example, approximately 4 cm, and a focal length in the range of 20–22 mm, for example, approximately 22 mm. Optics 118, however, may include any suitable optical element or configuration of optical elements for focusing light from object 110 onto sensor 120.

Sensor 120 detects the light reflected from object 110 directly through aperture 114, that is, through an uninterrupted pathway. Sensor 120 may be placed such that sensor 120 receives light generally in a direction that light travels from object 110 to aperture 114. Sensor 120 may detect certain types of energy, for example, infrared energy, of the light. Sensor 120 may enhance certain features of light or the signal such as, for example, an image intensifier tube or sensor. Sensor 120, however, may comprise any suitable sensor, for example, a long wave infrared sensor, a low light level charge coupled device (LLLCCD), or a complementary metal-oxide semiconductor (CMOS) sensor. A tube design generally would receive IR light and produce a visible light output signal, whereas a sensor design would receive visible light.

Sensor 120 generates sensor data set S1 in response to the received light. Sensor data set S1 may include values assigned to pixels corresponding to points of light, where the values represent image information such as brightness or color associated with the points of light. Sensor 120 transmits sensor data set S1 to a fusing module 140.

System 100 may also include an outer assembly 138 comprising reflective surfaces 130 and 132 and a sensor 134. Reflective surface 130 and sensor 134 may be coupled to outer casing 112, and reflective surface 132 may be coupled to inner casing 117. Any suitable configuration, however, may be used, for example, outer assembly 138 may be configured as a Schmidt-Cassegran catadioptric optical assembly, a diffractive optical system, or any combination of suitable configurations.

Reflective surface 130 receives light from object 110 through aperture 114 and reflects the received light. Reflective surface 130 may comprise a metallic or dichroic mirror having a diameter in the range of 8 to 10 cm, for example, approximately 9 cm and a focal length in the range of 24 to 26 mm, for example, approximately 25 mm. Reflective surface 130, however, may comprise any material and may have any shape suitable for receiving light through aperture 114 and reflecting light to reflective surface 132. Reflective surface 132 receives light from reflective surface 130 and reflects the received light. Reflective surface 132 may comprise a metallic or dichroic mirror having a diameter in the range of 7 to 10 cm, for example, approximately 8 cm and a focal length in the range of 24 to 26 cm, for example, approximately 25 mm. Reflective surface 132, however, may comprise any material and may have any shape suitable for receiving light from reflective surface 130 and reflecting light to a receptor area 133 of sensor 134.

Receptor area 133 of sensor 134 detects light reflected from reflective surface 132. Sensor 134 may include, for example, an infrared sensor or an image intensifier sensor. Sensor 134, however, may comprise any suitable sensor, for example, a long wave infrared sensor, a medium wave infrared sensor, a short wave infrared sensor, a low light level charge coupled device (LLLCCD), or a complementary metal-oxide semiconductor (CMOS) sensor. Sensor 134 generates sensor data set S2 in response to the received light. Sensor 134 may generate a different type of data set than that generated by sensor 120. For example, sensor 120 may include an infrared sensor that detects infrared energy of received light to generate a data set, and sensor 134 may include an image intensifier sensor that enhances certain features of received light to generate a different type of data set. Sensor data set S2 may include values assigned to pixels corresponding to points of light; where the values represent image information associated with the points of light. Sensor 134 transmits sensor data S2 to fusing module 140.

System 100 may have a central axis 136 located approximately along a light path from object 110 to receptor area 133 of sensor 134. Sensor 120 and sensor 134 may be substantially coaxial such that sensor 120 and sensor 134 receive light at a point approximately along central axis 136. Sensor 120 and sensor 134 may be configured such that the diameter of inner assembly 116 is less than the diameter of reflective surface 130, and inner assembly 116 is approximately centered over reflective surface 130 as illustrated in FIG. 1B. FIG. 1B illustrates a front view of system 100 where inner assembly 116 is approximately centered in front of reflective surface 130. In the illustrated embodiment, the configuration of sensors 120 and 134 allows sensors 120 and 134 to receive light from the same aperture with minimal reflective and refractive elements, providing for a compact imaging system.

Fusing module 140 receives sensor data S1 and S2 from sensors 120 and 134, respectively. Fusing module 140 fuses sensor data sets S1 and S2 to generate fused data. For example, fusing module 140 combines values of sensor data sets S1 and S2 for pixels corresponding to the same point of light to generate the fused data. Fusing module 140 may use any suitable process for fusing data sets S1 and S2, for example, digital imaging processing, optical overlay, or analog video processing.

In the illustrated embodiment, sensor 120 and sensor 134 detect light received through the same aperture 114, so both sensors 120 and 134 receive light describing the same point of view of object 110. As a result, fusing module 140 does not need to perform data processing to reconcile different points of view. Additionally, since minimal reflective and refractive elements are used, the light detected by sensors 120 and 134 undergoes few changes. As a result, fusing module 140 does not need to perform processing to compensate for changes due to multiple reflective and refractive elements.

Display 142 receives the fused data from fusing module 140, and generates an image of object 110 using the fused data. Display 142 may include any suitable system for displaying image data, such as an organic light-emitting diode (OLED), nematic liquid-crystal display (LCD), or field emitting display (FED), in panel display, eyepiece display, or near-to-eye display formats. Optionally, display 142 may be an external display, television, Universal Serial Bus (USB) type connection, IEEE 1334 or firewire type connection, or similar. Although the illustrated embodiment shows two sensors 120 and 134, the system of the present invention may include any suitable number of sensors, as described in connection with FIG. 2.

Although the illustrated embodiment shows two sensors 120 and 134, the system of the present invention may include any suitable number of sensors, as described in connection with FIG. 2.

FIG. 2 is a block diagram of one embodiment of a system 200 that includes three sensors for gathering image data. System 200 includes an inner assembly 216 coupled to an outer casing 212. Inner assembly may be substantially similar to system 100 of FIG. 1, which includes two sensors 120 and 134. Outer assembly 238 may be substantially similar to outer assembly 138. That is, reflective surfaces 230 and 232, which may be substantially similar to reflective surfaces 130 and 132, respectively, are coupled to inner assembly 216 and outer casing 212, respectively. Additionally, sensor 234, which may be substantially similar to sensor 134, is coupled to outer casing 212. Sensors 120, 134, and 234 may be substantially coaxial. Fusing module 140 is coupled to sensors 120, 134, and 234, and display 142 is coupled to fusing module 140.

In operation, system 200 receives light reflected from object 110. Inner assembly 216 may generate data sets S1 and S2 in a manner substantially similar to that of system 100 of FIG. 1. Sensor 234 receives light reflected from reflective surfaces 230 and 232 in a substantially similar matter to that of sensor 134 to generate dataset S3. Fusing module 140 receives datasets S1, S2 and S3 and fuses the datasets to generate fused data. Display 142 receives the fused data and generates an image from the fused data. Additional sensors may be added to system 200.

Figure 3:
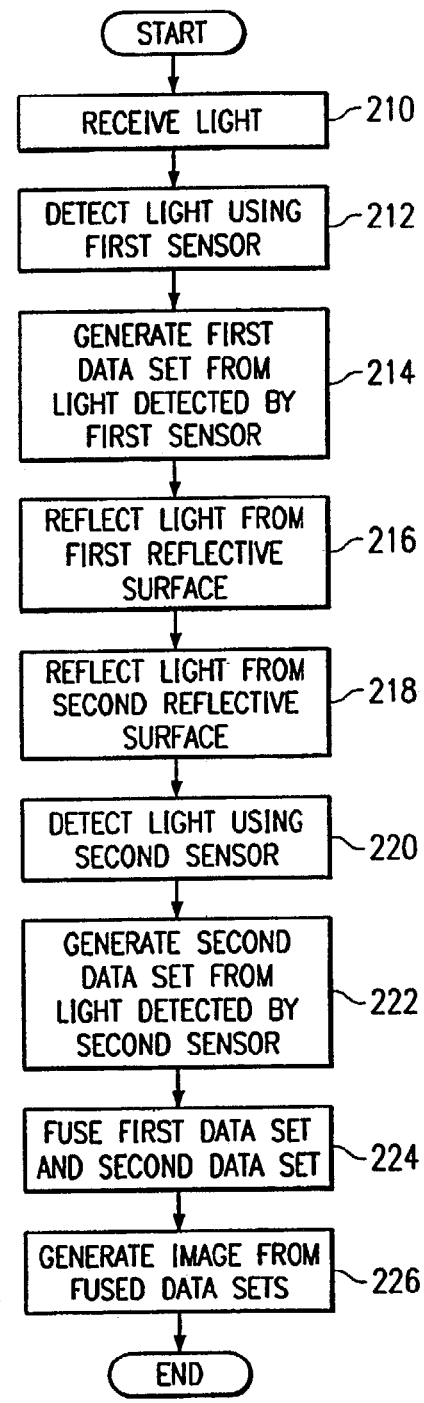
FIG. 3 is a flowchart demonstrating one embodiment of a method that may be used with the system of FIG. 1.

FIG. 3 is a flowchart illustrating one embodiment of a method for gathering image data using system 100 of FIG. 1. The method begins at step 210, where light reflected from object 110 is received by. aperture 114. The reflected light includes image information that may be used to form an image of object 110. At step 212, sensor 120 detects the received light. Optics 118 may be used to focus the light onto sensor 120. Sensor 120 generates a data set S1 from the detected light and transmits data set S1 to fusing module 140 at step 214. Sensor 120 may, for example, detect infrared light reflected from object 110 and generate a data set S1 that describes the infrared light.

At step 216, reflective surface 130 receives light from object 110 and reflects the received light to reflective surface 132. Reflective surface 132 receives the reflected light and, in turn, reflects the received light to sensor 134 at step 218. At step 220, sensor 134 detects light reflected from reflective surface 132. Sensor 134 generates data set S2 from the received light at step 222. Sensor 134 may include an image intensifier sensor that enhances certain features of the light received from object 110, and may generate a data set that describes the enhanced features.

At step 224, fusing module 140 receives data sets S1 and S2 and fuses the received data sets to generate fused data. Fusing module 140 may, for example, combine values from data sets S1 and S2 for pixels corresponding to the same point of light. Display 142 receives the fused data and then displays an image of object 110 at step 226. After displaying the image, the method terminates.

Figure 4:
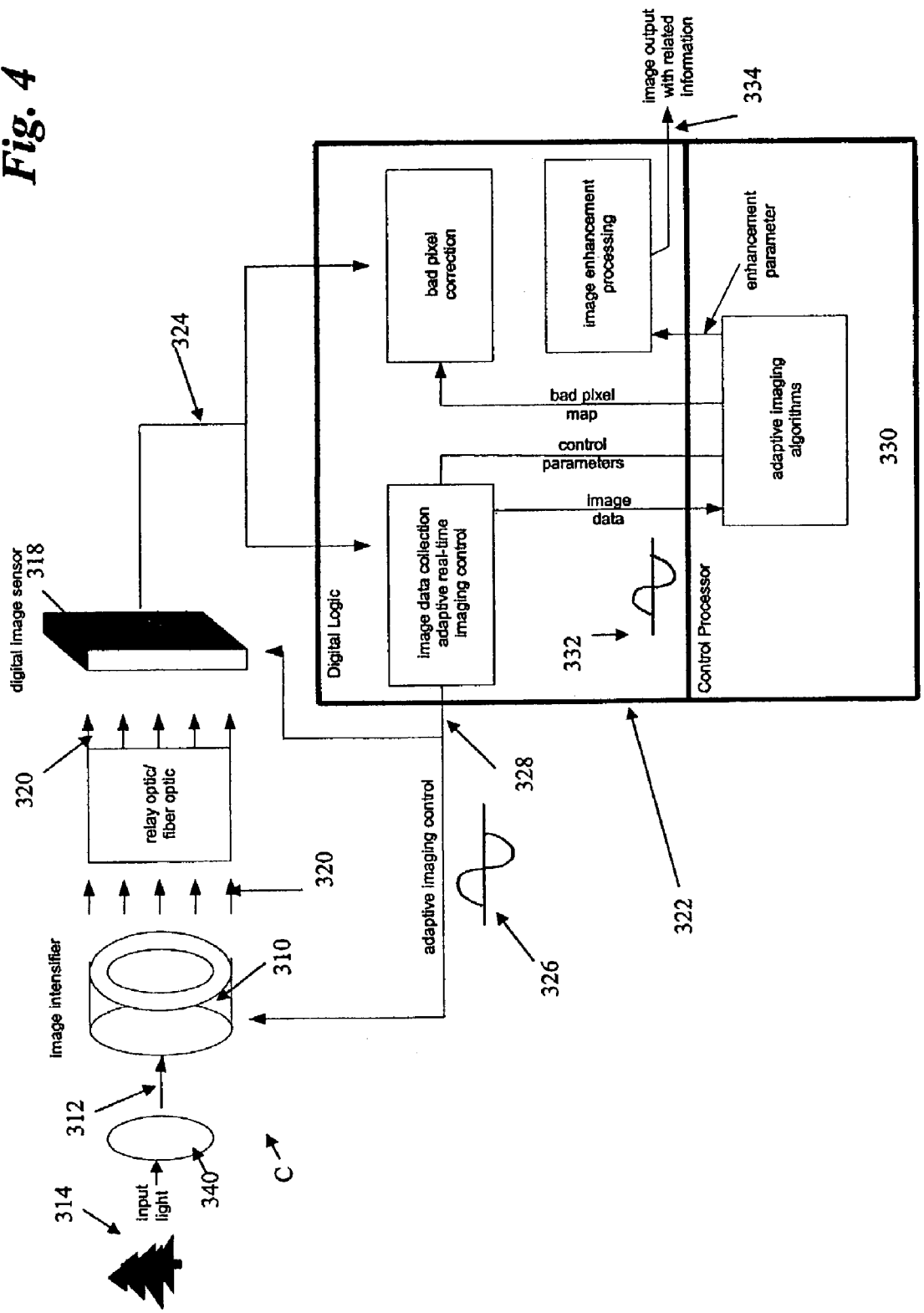
FIG. 4 illustrates an embodiment of the image intensification camera system.

Referring specifically to FIG. 4, a digital image intensifier ("I2") camera system C may be used in a multi-spectral fused-image device in one embodiment.

The I2 camera C preferably consists of the following components:

1) An image intensifier tube device 310, which amplifies received light 314 from a scene 314 to be observed;

2.a) A relay optic assembly or fiber optic bond 316 between the image intensifier 310 and a digital image sensor 318 communicates the output signal 320 generated by the image intensifier 310;

2.b) An optional system controlled transmission limiter 340 for bright light conditions;

3) An image sensor 318, such as a CMOS device or charge coupled device (CCD); and, 4) Digital logic circuitry 322 to process, enhance, and/or output image or related data, as desired.

The present I2 camera C further optionally includes electronic circuitry 322 to control, monitor or affect: a) adaptive scene analysis and enhancement; b) automatic bad sensor pixels detection and correction; and, c) external or internal camera synchronization and timing. The digital logic 322 received a signal input 324 from the sensor 318. The digital logic 322 also generates one or more control signals 326 that is passed to either the image intensifier tube system 310 or the sensor 318, or both components, via output 328 from the digital logic 322. Furthermore, the digital logic circuitry 322 optionally may include a control processor sub-system 330 that passes signals 332 between itself and other sub-systems designed within the digital logic circuitry 322.

The image intensifier assembly 310 includes a known image intensifier tube and accompanying electronic circuitry typical for the operation of such image intensifiers.

Adaptive scene analysis and enhancement: The digital logic 322 maintains a continuous brightness profile of the entire image, or of a particular region of the image 320 sensed by the sensor 318. Any and all of the following parameters may then be (automatically or manually) adjusted by the supporting digital logic 322 or the user to create the optimum image for any scene.

The automatic optimization algorithm generally examines the current image and compares it to stored information about optimum imaging parameters versus input scene conditions. For example, in bright light, the camera C may reduce image intensifier 310 on-time and gain, raise the reference voltages on the sensor 318 ADC, and digitally dampen some very bright features in the output scene. As the scene brightness decreases in this example, the digital logic system 322 would increase sensor gain before increasing intensifier gain to maintain intensifier 310 lifetime and signal-to-noise ratio. In very dark scenes, the system 322 would turn the sensor gain up to reasonable operating limits, turn intensifier gain up, and possibly decrease frame rate to increase image exposure time.

One such camera benefits from a priori knowledge of image intensifier response to various lighting conditions. In each case, imaging parameters are simultaneously adjusted to achieve imaging performance well beyond that of other, similarly equipped, cameras.

The breakdown of separately adjustable parameters may be as follows:

1. Sensor Frame Rate:

The frame rate, and thus the exposure time, of the sensor 318 may be dynamically altered. In dim scenes, for example, the image intensifier gain may be reduced (increasing the signal-to-noise ratio), while frame rate is decreased. This allows for an increase in image quality without additional input light.

2. Contrast/Brightness/Digital Image Enhancement:

Digital logic 322 dynamically increases contrast by mathematically determining the optimum brightness distribution of pixels in the sensed scene. This automatic enhancement may be weighted with preferred user brightness parameters, or by pre-set imaging modes (e.g. day mode, fog mode, etc.) The system makes use of the full input brightness resolution. For example, in one embodiment, the system would dynamically map 10-bit input data to 8-bit output data, rather than simply truncating the lowest two bits.

3. Digitally Controlled Image Intensifier Gain:

Intensifier gain may be automatically or manually adjusted to increase lifetime, increase signal-to-noise ratio, or increase scene brightness, depending on system goals.

4. Digitally Controlled Image Intensifier Gating:

Digital logic 322 may synchronize image intensifier 310 on-time with the digital sensor 318 exposure time. This ensures that there will be no brightness fluctuations between scenes caused by differences in the intensifier exposure frequency and the sensor exposure frequency function could be user-controllable through a graphical user interface (GUI).

5. Electronically and Manually Controllable Digital Sensor Analog References:

Image sensor 318 imaging and timing control parameters may be automatically controllable to provide optimum imaging parameters for all lighting conditions. As such, an optimum balance between image intensifier 310 and image sensor 318 parameters may be found for any external lighting condition. The user could be capable of manually adjusting these parameters via the GUI.

Such imaging adjustments may also be performed by the processor 322 controlling a transmission limiter 340, tube gain for the image intensifier tube 310, tube gating, sensor frame rate, or sensor integration time (per pixel) for a CMOS type sensor, for example. The processor circuit 322 can control such identified parameters for optimum scene clarity or other desired effects in real time for all applicable lighting conditions.

The transmission limiter 340 can be an electro-mechanical iris or equivalent electro-optical (EO) filter, such as a variable LCD transmission filter, or the like.

Automatic bad sensor pixels detection and correction: The present I2 camera C optionally automatically digitally detects and corrects, through interpolation, pixels that remain stuck bright (or dark) on the sensor 318.

External or internal camera synchronization and timing: The camera C may be capable of running continuously at a desired frame rate, or of providing digital data to the output 334 one line at a time, upon request from an external device. This capability would make the camera C ideal for both single-sensor and multi-sensor imaging within a single image fusion device.

Figure 5:
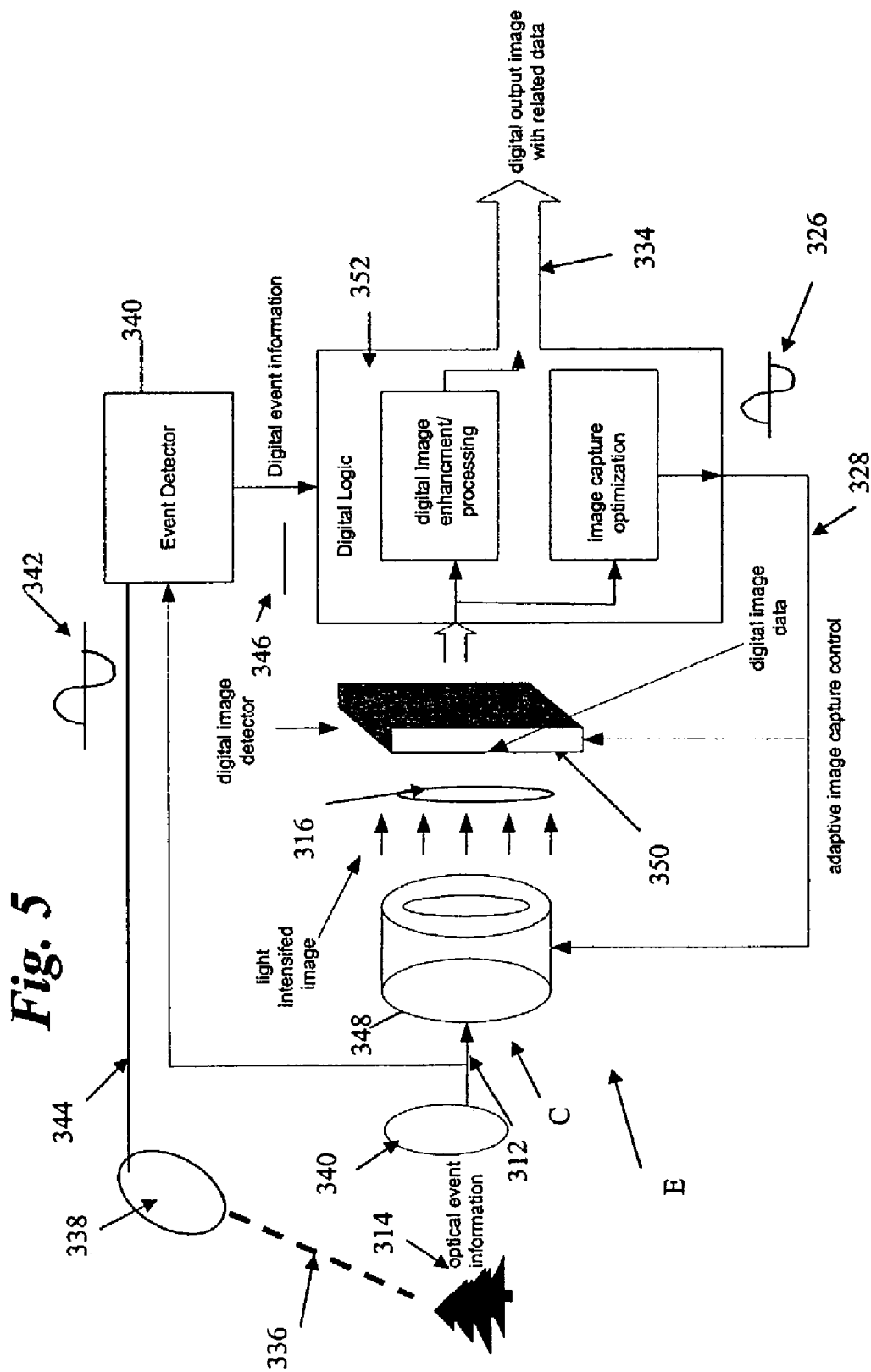
FIG. 5 illustrates another embodiment of the image intensification camera system of the present invention.

Referring now to FIG. 5 the present method and apparatus for event synchronization may be used to synchronize the discharge of or a laser beam 336 generated by a laser 338 with the digital camera system C that is used to view an observed scene 314 illuminated by the laser discharge 336.

The present system E for event synchronization includes the following two main subcomponents:

1. An event detector electronic circuit 340, which, in one embodiment of the present invention, may be a circuit that digitizes electrical signals 342 from the laser 338 (indicating a discharge) communicated by path or electrical connection 344, or an apparatus to detect laser energy and generate an appropriate digital signal 346.

2. A digital camera system C that may consist of the following parts:

a) An image intensifier tube sub-system 348 with its accompanying electronic circuitry for operation (not shown), which image intensifier 348 is preferably sensitive to the spectral region of the laser 338 or other selected optical event;

b) A digital image sensor 350 (which may include a CCD, CMOS, or other device), optically coupled to the image intensifier 348 by a relay optic assembly or a fiber optic bond 316, and c) Digital logic circuitry 352 to receive, process, enhance, and output the image or related data, as desired.

In the present method the digital logic 352 preferably uses digital information or signal 346 from the event detector 340 to determine the temporal location of the event (t0). Some or all of the camera components may be controllable using the digital logic circuitry 352 to allow for precise camera control relative to t0 such as by way of example, a laser discharge. In an exemplary system, the image intensifier gain, on-time, and gate-disable signals may be precisely controllable relative to t0. The sensor exposure window and gain parameters may also be controllable relative to t0.

Some of the features and advantages of present invention are described with respect to an exemplary imaging system.

1. Signal-to-noise ratio is increased over traditional imaging systems, because the imaging equipment is only on during the very small percentage of time that the laser energy is present in the scene. During this time, however, camera gain is instantly set well above normal, to levels that would overexpose the scene if it were imaging in a non-synchronizing manner. The end result is that the laser energy is far brighter than the surrounding scene, making image enhancement a much easier task for the digital circuitry.

2. Given the advantages of 1. immediately above, the digital logic 352 is able to detect the presence and location of laser energy in a digitally captured scene. It is then able to perform a variety of image enhancements, digital graphic overlays, and further informational calculations (e.g. target size).

3. Synchronization logic controls the exact temporal exposure window relative to t0, thus effectively controlling the range (distance) imaged. Combined with the automatic detection capabilities of feature 2. immediately above, this gives the present system the ability to automatically provide range data, without user input. Previous systems generally have required the user to manually change the range viewed to visually determine the presence of laser energy.

4. A predictive event anticipation logic module within the digital logic 352 may offer closer range (all the way to zero) viewing than reactive-only synchronization systems, in which the minimum viewing range is determined by the distance light travels during the propagation delay between the event and the camera turn-on. The digital logic portion 352 may process and store past event synchronization data to determine when the next event will most likely occur, providing the ability to predict an optical event down to the precision of the event itself.

By controlling the image intensifier 348, sensor 350, and the desired digital logic circuitry 352 in tandem, the present imaging system E is able to achieve far greater performance than similarly equipped traditional imaging systems.

The foregoing disclosure and description of the invention are illustrative and explanatory thereof, and various changes in the size, shape and materials, as well as in the details of the illustrated construction may be made without departing from the spirit of the invention.

What is claimed:

1. An event synchronization apparatus for an image intensification camera system for gathering image data, the apparatus comprising:

an image intensifier means for amplifying received light;

a light transmitting assembly between the image intensifier and a digital image sensor to communicate the amplified received light from the image intensifier;

a digital image sensor to receive and electronically transform the amplified received light from the image intensifier;

digital logic circuitry electronically connected to at least the digital image sensor to process an image or related data; and, an event detector circuit for digitizing an input signal from an illuminator source and for generating an output signal communicated to the digital logic in response to the input signal from the illuminator source.

2. The invention of claim 1 wherein the digital logic circuitry adjusts one or more operating characteristics of the digital image sensor selected from the group consisting of:

digital frame rate; contrast and brightness; digital image enhancement; bad sensor pixel detection and correction; and camera synchronization.

3. The invention of claim 1 wherein the digital logic circuitry adjusts one or more operating characteristics of the image intensifier selected from the group consisting of: image intensifier gain; gating; and synchronization.

4. The invention of claim 1 wherein the digital image sensor is a charge coupled device (CCD).

5. The invention of claim 1 wherein the digital image sensor is a CMOS device.

6. The invention of claim 1 wherein the light transmitting assembly is a relay optic.

7. The invention of claim 1 wherein the light transmitting assembly is a fiber optic bond.

* * * * *